United States Patent
Wu et al.

(10) Patent No.: US 10,487,238 B2
(45) Date of Patent: Nov. 26, 2019

(54) NON-ISOCYANATE POLYURETHANE INKS FOR 3D PRINTING

(71) Applicant: 3D Systems, Incorporated, Rock Hill, SC (US)

(72) Inventors: Bo Wu, Wilsonville, OR (US); Jeffery Banning, Wilsonville, OR (US); Pingyong Xu, Valencia, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 16/390,959

(22) Filed: Apr. 22, 2019

(65) Prior Publication Data

US 2019/0249033 A1 Aug. 15, 2019

Related U.S. Application Data

(63) Continuation of application No. 15/453,277, filed on Mar. 8, 2017, now Pat. No. 10,316,214.

(60) Provisional application No. 62/305,051, filed on Mar. 8, 2016.

(51) Int. Cl.

| | |
|---|---|
| *C09D 175/12* | (2006.01) |
| *C09D 11/10* | (2014.01) |
| *C09D 11/54* | (2014.01) |
| *B33Y 10/00* | (2015.01) |
| *B33Y 80/00* | (2015.01) |
| *C09D 4/00* | (2006.01) |
| *B29C 64/112* | (2017.01) |
| *B33Y 70/00* | (2015.01) |
| *C09D 11/101* | (2014.01) |
| *B29K 75/00* | (2006.01) |
| *B29K 105/00* | (2006.01) |

(52) U.S. Cl.
CPC .......... *C09D 175/12* (2013.01); *B33Y 10/00* (2014.12); *B33Y 80/00* (2014.12); *C09D 4/00* (2013.01); *C09D 11/10* (2013.01); *C09D 11/101* (2013.01); *C09D 11/54* (2013.01); *B29C 64/112* (2017.08); *B29K 2075/00* (2013.01); *B29K 2105/0058* (2013.01); *B33Y 70/00* (2014.12)

(58) Field of Classification Search
CPC .... C09D 175/12; C09D 11/10; C09D 11/101; C09D 11/54; B33Y 10/00; B33Y 80/00; B33Y 70/00; B29C 64/112; B29K 2075/00; B29K 2105/0058
USPC .......................................................... 264/494
See application file for complete search history.

(56) References Cited

U.S. PATENT DOCUMENTS

| | | | | |
|---|---|---|---|---|
| 5,856,382 | A * | 1/1999 | Ohrbom | C08G 59/1405 523/414 |
| 8,026,307 | B2 * | 9/2011 | Miller | B82Y 30/00 524/437 |
| 9,765,238 | B2 * | 9/2017 | Klopsch | C08G 77/38 |
| 2007/0072981 | A1 * | 3/2007 | Miller | B82Y 30/00 524/445 |
| 2014/0256874 | A1 * | 9/2014 | Chasser | C09D 169/00 524/612 |
| 2016/0186008 | A1 * | 6/2016 | Klopsch | C08G 77/38 427/249.1 |

FOREIGN PATENT DOCUMENTS

WO WO-2010089264 A1 * 8/2010 ........... C07D 317/36

* cited by examiner

*Primary Examiner* — Michael Bernshteyn

(57) ABSTRACT

In one aspect, inks for use with a 3D printer are described herein. In some embodiments, an ink described herein comprises a cyclic carbonate monomer and an amine monomer. Further, in some instances, an ink described herein also comprises an ethylenically unsaturated monomer such as a (meth)acrylate. Additionally, an ink described herein, in some cases, further comprises a colorant, such as a molecular dye, a particulate inorganic pigment, or a particulate organic colorant. An ink described herein may also comprise one or more additives selected from the group consisting of inhibitors, stabilizing agents, photoinitiators, and photosensitizers.

18 Claims, 3 Drawing Sheets

A = OH or Cl

NON-ISOCYANATE POLYURETHANE INKS FOR 3D PRINTING

CROSS REFERENCE TO RELATED APPLICATIONS

This application claims priority pursuant to 35 U.S.C. § 119 to U.S. Provisional Patent Application Ser. No. 62/305,051, filed on Mar. 8, 2016; and U.S. Non-Provisional application Ser. No. 15/453,277, filed on Mar. 8, 2017 now U.S. Pat. No. 10,316,216; each of which is hereby incorporated by reference in their entirety.

FIELD

The present invention relates to inks and, in particular, to inks for use with three-dimensional (3D) printing systems.

BACKGROUND

Some commercially available 3D printers, such as the ProJet™ 3D Printers manufactured by 3D Systems of Rock Hill, S.C., use inks, which are also known as build materials, that are jetted through a print head as a liquid to form various 3D objects, articles, or parts. Other 3D printing systems also use an ink that is jetted through a print head or otherwise dispensed onto a substrate. In some instances, the ink is solid at ambient temperatures and converts to liquid at elevated jetting temperatures. In other instances, the ink is liquid at ambient temperatures. Moreover, in some cases, the ink can be cured following dispensing and/or deposition of the ink onto the substrate.

Other 3D printers form 3D articles from a reservoir, vat, or container of a fluid ink or build material or a powdered ink or build material. In some cases, a binder material or a laser, digital light processing (DLP) source, or other source of energy is used to selectively solidify or consolidate layers of the ink or build material in a stepwise or layer-by-layer fashion to provide the 3D article.

Inks for 3D printing systems can be used to form a variety of articles for a variety of applications, including in a manner described hereinabove. However, some inks for 3D printing systems include (meth)acrylates as a primary curable material. Such inks may provide high printing resolution but may provide printed 3D articles having limited toughness. Other inks may provide both high resolution and high toughness but may suffer from the presence of one or more toxic or non-biocompatible materials. Therefore, there exists a need for improved inks for 3D printing, including inks that can provide a combination of desirable properties, such as high printing resolution, high toughness, reduced toxicity, and reduced skin sensitization or irritation of a printed 3D article.

SUMMARY

In one aspect, inks for use with a 3D printer are described herein which, in some embodiments, may offer one or more advantages over prior inks. In some embodiments, for example, an ink described herein can provide printed 3D articles having high printing resolution, high toughness, reduced toxicity, and reduced skin sensitization or irritation. Reduced toxicity and reduced skin sensitization or irritation can be achieved at least in part by the exclusion of isocyanates and/or isocyanate degradation or reaction products.

In some embodiments, an ink for use in a 3D printing system described herein comprises a cyclic carbonate monomer and an amine monomer. Such an ink might be particularly useful for a 3D printing system, such as a contacting stereolithography (cSLA) printing system or other stereolithography (SLA) printing system, in which the cyclic carbonate and amine monomers are combined under conditions (e.g., time and temperature conditions) that are not sufficient for substantial reaction between the cyclic carbonate and amine monomers to occur prior to printing.

Alternatively, as described further hereinbelow, 3D printing may be carried out using a plurality of inks, wherein a first ink comprises a cyclic carbonate monomer, and a second ink comprises an amine monomer. Such a dual ink system may be particularly useful for a 3D printing system, such as a multi-jet modeling (MjM) system, in which it may be desirable not to combine the cyclic carbonate monomer with the amine monomer prior to printing.

Further, in some embodiments, a cyclic carbonate monomer of an ink described herein further comprises one or more additional curable moieties, other than the cyclic carbonate moiety or moieties of the monomer. For instance, in some cases, a cyclic carbonate monomer comprises one or more ethylenically unsaturated moieties such as one or more (meth)acrylate moieties. Some such monomers can include a novel chemical species. Thus, in another aspect, novel dual-functional polymerizable species are described herein. In still another aspect, the use of such species for adhesive and/or coating applications is also described herein.

In addition, in some instances, an ink described herein further comprises one or more curable materials or monomers other than the cyclic carbonate monomer and the amine monomer. For example, in some embodiments, an ink further comprises an ethylenically unsaturated monomer, such as a (meth)acrylate monomer. In some cases, an ethylenically unsaturated monomer described herein can be polymerized separately from the cyclic carbonate and amine monomers of the ink. For instance, the cyclic carbonate and amine monomers of the ink can react with one another to form a first polymer network, and (meth)acrylate monomers (or other additional curable material) of the ink can react with one another to form a second polymer network. In such cases, the first and second polymer networks can be separate or differing polymer networks. Additionally, in some embodiments, the first and second polymer networks can together form an interpenetrating polymer network. Moreover, the first and second polymer networks can be formed through differing polymerization processes.

As described hereinabove, 3D printing may be carried out according to the present disclosure using a single ink capable of forming a polymer or oligomer from a cyclic carbonate and an amine, or using a combination of differing inks that, when combined, are capable of forming a polymer or oligomer from a cyclic carbonate and an amine. Thus, in another aspect, kits for use in a 3D printing system are described herein. In some embodiments, such a kit comprises a first ink comprising a cyclic carbonate monomer and a second ink comprising an amine monomer. Moreover, in some such instances, the first ink further comprises an ethylenically unsaturated monomer, such as a (meth)acrylate.

It is to be understood that inks described herein, whether "single" inks or inks that are part of a kit, may further comprise one or more additional components in addition to curable materials described hereinabove. For example, in some embodiments, an ink described herein further comprises one or more additives selected from the group consisting of colorants, inhibitors, stabilizing agents, photoinitiators, and photosensitizers.

In another aspect, uses of a composition for 3D printing are described herein, wherein the composition comprises an ink or kit described hereinabove. For instance, in some cases, a use of a composition for 3D printing is described herein, wherein the composition comprises an ink comprising a cyclic carbonate monomer and an amine monomer.

In still another aspect, 3D printing systems are described herein. Such a 3D printing system can comprise a composition for 3D printing described hereinabove, such as a composition comprising an ink or kit described hereinabove. In some embodiments, a 3D printing system described herein comprises a 3D printer having at least one ink dispenser or ink reservoir, and a composition described herein disposed in the ink dispenser or the ink reservoir. The composition can comprise any ink described herein for use in 3D printing. For example, in some cases, a 3D printing system described herein comprises a 3D printer having at least one of an ink dispenser and an ink reservoir, and an ink disposed in the ink dispenser, the ink reservoir, or both, wherein the ink comprises a cyclic carbonate monomer. Moreover, in some instances, such a 3D printer further comprises a second ink dispenser or reservoir and a second ink disposed in the second ink dispenser or reservoir, wherein the second ink comprises an amine monomer.

In another aspect, methods of printing a 3D article are described herein, wherein the method is carried out using one or more inks described herein. In some cases, such a method comprises selectively jetting or otherwise depositing layers of an ink in a fluid state onto a substrate, wherein the ink comprises a cyclic carbonate monomer and an amine monomer. Additionally, in some cases, the layers of the ink are deposited in a layer-by-layer manner according to an image of the 3D article in a computer readable format. Moreover, in some embodiments, a method described herein further comprises thermally curing the cyclic carbonate monomer and the amine monomer. Such curing may be carried out in a layer-by-layer manner during the printing process, or in a "post-processing" step, such as a curing step carried out after completion of printing of all layers of the article. Further, whenever in the process it occurs, such curing can comprise reacting the cyclic carbonate monomer with the amine monomer to form a polyurethane. Moreover, in some instances, an ink used in a method described herein comprises one or more (meth)acrylates and the method further comprises curing the (meth)acrylates with electromagnetic radiation, such as ultraviolet (UV) light or visible light. Such curing can comprise polymerizing the ethylenically unsaturated moieties of the (meth)acrylates to form a poly(meth)acrylate. Additionally, in some cases, as described further herein, the poly(meth)acrylate and the polyurethane can together form an interpenetrating polymer network.

As described above, a method of printing a 3D article described herein can be carried out using a plurality of inks rather than one ink described herein. Such a method, in some cases, comprises selectively depositing layers of a first ink in a fluid state onto a substrate, and selectively depositing layers of a second ink in a fluid state onto the substrate, wherein the first ink and the second ink comprise a first ink and a second ink, respectively, of a kit described herein. In particular, the first ink can comprise a cyclic carbonate monomer, and the second ink can comprise an amine monomer. In addition, in some embodiments, the first ink comprises one or more (meth)acrylates and the method further comprises photocuring the one or more (meth)acrylates, such as with UV light. Such curing can comprise polymerizing the ethylenically unsaturated moieties of the (meth)acrylates to form a poly(meth)acrylate. A method described herein may further comprise curing the cyclic carbonate monomer of the first ink and the amine monomer of the second ink, such as by thermally curing these monomers. Curing in this manner can comprise reacting the cyclic carbonate monomer with the amine monomer to form a polyurethane. As described further herein, the poly(meth)acrylate and the polyurethane can together form an interpenetrating polymer network.

Further, in still other embodiments, a method of printing a 3D article described herein does not necessarily comprise jetting or otherwise depositing an ink described herein onto a substrate according to digital data representing the 3D article. Instead, in some cases, a method of printing a 3D article described herein comprises retaining an ink in a fluid state in a container, and selectively applying energy to the ink in the container to solidify at least a portion of a first fluid layer of the ink, thereby forming a first solidified layer that defines a first cross-section of the article. The ink can comprise any ink described hereinabove. Moreover, such a method can further comprise raising or lowering the first solidified layer to provide a second fluid layer of the ink at a surface of the fluid ink in the container, and selectively applying energy to the ink in the container to solidify at least a portion of the second fluid layer of the ink, thereby forming a second solidified layer that defines a second cross-section of the article. The first cross-section and the second cross-section are bonded to one another in a z-direction.

In another aspect, printed 3D articles are described herein. Such articles can be formed from one or more inks and/or using one or more methods described hereinabove.

These and other embodiments are described in greater detail in the detailed description which follows.

DETAILED DESCRIPTION

Figure 1:
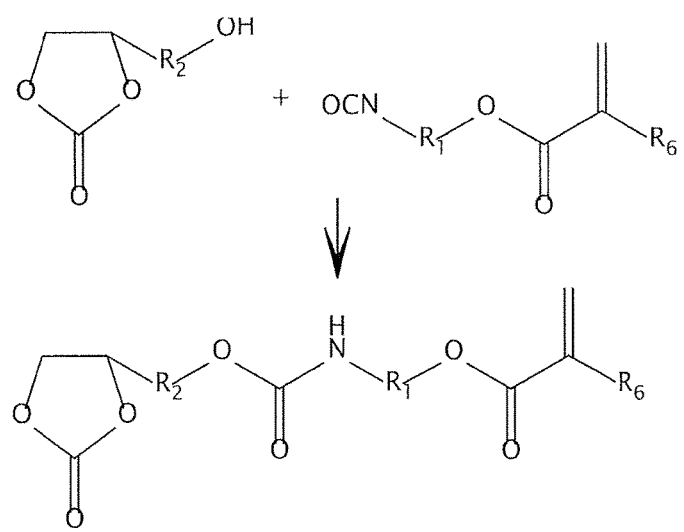
FIG. 1 illustrates a reaction scheme for forming a cyclic carbonate monomer suitable for use in an ink according to some embodiments described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Inks and Kits for 3D Printing

In one aspect, inks for use with a 3D printer are described herein. In some embodiments, an ink described herein comprises a cyclic carbonate monomer and an amine monomer. Further, in some instances, an ink described herein also comprises an ethylenically unsaturated monomer such as a (meth)acrylate. Additionally, an ink described herein, in some cases, further comprises a colorant, such as a molecular dye, a particulate inorganic pigment, or a particulate organic colorant. An ink described herein may also comprise one or more additives selected from the group consisting of inhibitors, stabilizing agents, photoinitiators, and photosensitizers.

Turning now in detail to specific components of inks, inks described herein comprise a cyclic carbonate monomer. For reference purposes herein, it is to be understood that a "monomer" is a chemical species having one or more functional groups or moieties that can react with one another to form one or more covalent bonds, particularly as part of a polymerization reaction. Any cyclic carbonate monomer not inconsistent with the objectives of the present disclosure may be used. For example, the cyclic carbonate monomer can comprise a plurality of cyclic carbonate moieties, such as two, three, or four cyclic carbonate moieties. In some cases, the cyclic carbonate monomer has the structure of Formula (A1), Formula (A2), Formula (A3), or Formula (A4):

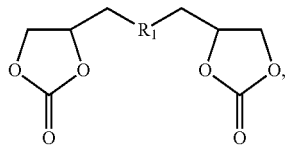
(A1)

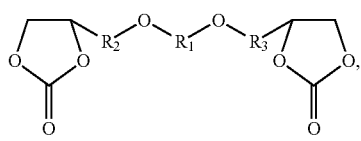
(A2)

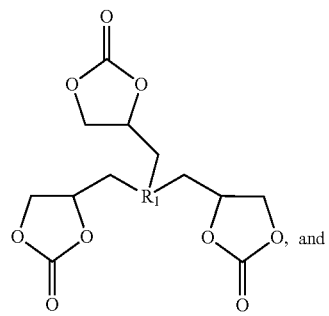
(A3)

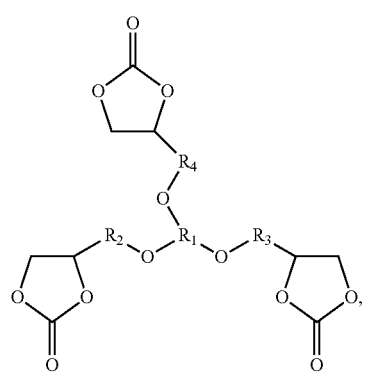
(A4)

wherein $R_1$, $R_2$, $R_3$, and $R_4$ are each independently a linear or branched C1-C36 alkyl or alkylene, alkenyl or alkenylene, aryl or arylene, or heteroaryl or heteroarylene moiety. For example, in some cases, $R_1$ is $(CH_2)_4$, and $R_2$ and $R_3$ are each $CH_2$ in the structure of Formula (A2).

Moreover, in some instances, the cyclic carbonate monomer has the structure of Formula (A5):

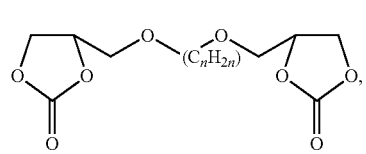
(A5)

wherein n is an integer from 1 to 36. The cyclic carbonate monomer of an ink described herein may also have the structure of Formula (A6):

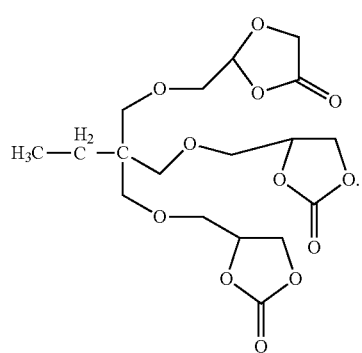
(A6)

In still other embodiments, the cyclic carbonate monomer has the structure of Formula (A7), Formula (A8), or Formula (A9):

(A7)
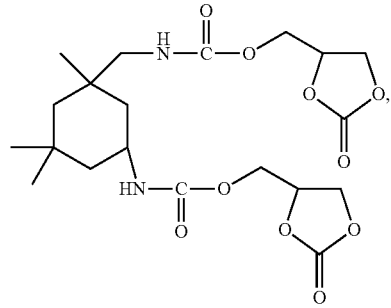

(A8)
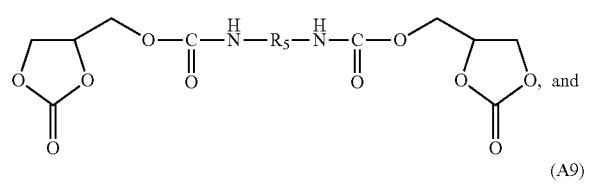
and (A9)
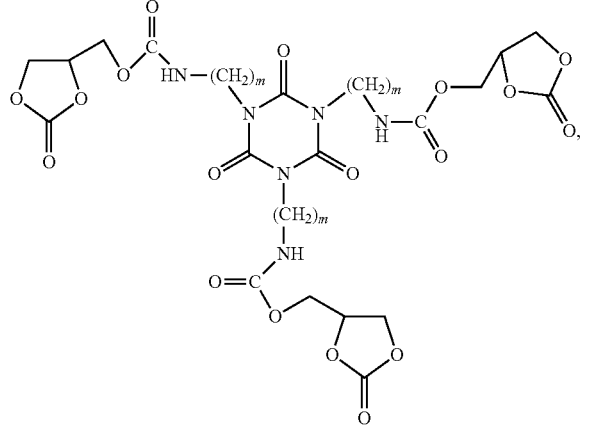

wherein m is an integer from 1 to 36, and $R_5$ is a linear or branched C2-C36 alkyl or alkylene, alkenyl or alkenylene, aryl or arylene, or heteroaryl or heteroarylene moiety. In some embodiments, for instance, $R_5$ is $(CH_2)_6$.

In some instances, the cyclic carbonate monomer has the structure of Formula (A10), Formula (A11), Formula (A12), or Formula (A13):

(A10)
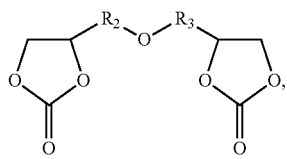

(A11)
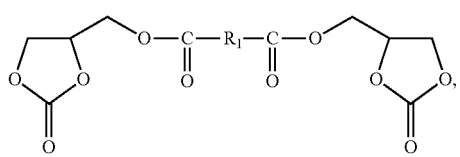

(A12)
, and (A13)
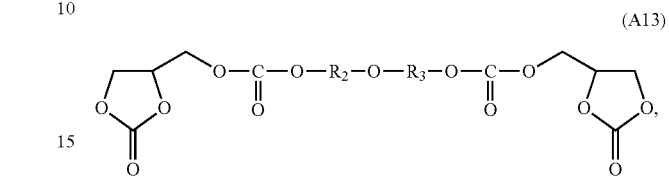

wherein $R_1$, $R_2$, and $R_3$ are each independently a linear or branched C1-C36 alkyl or alkylene, alkenyl or alkenylene, aryl or arylene, or heteroaryl or heteroarylene moiety, and $R_5$ is a linear or branched C2-C36 alkyl or alkylene, alkenyl or alkenylene, aryl or arylene, or heteroaryl or heteroarylene moiety. In some embodiments, for instance, $R_1$ is $(CH_2)_{1-10}$, such as $(CH_2)_8$, $R_2$ is $(CH_2)$ or $(CH_2)_2$, $R_3$ is $(CH_2)$ or $(CH_2)_2$, and $R_5$ is $(CH_2)_6$ or $(C_6H_4)-C(Me)_2-(C_6H_4)$.

Cyclic carbonate monomers such as the foregoing may be commercially available (for example, from SPECIFIC POLYMERS, as in the case of monomers having the structure of Formula (A2) or Formula (A6), for instance), or may be obtained by reacting a first chemical species comprising a hydroxyl moiety and a cyclic carbonate moiety with a second chemical species comprising one or more isocyanate moieties. In this manner, one or more cyclic carbonate moieties of the first chemical species may be bonded to the second chemical species through the formation of one or more urethane bonds, such as the urethane bonds of the structures of Formula (A7), Formula (A8), and Formula (A9) above. Cyclic carbonate monomers, such as those having the structures of Formula (A10), Formula (A11), and Formula (A12), may also be formed as described in U.S. Pat. No. 3,072,613. For instance, a cyclic carbonate monomer having the structure of Formula (A10) in which $R_2$ and $R_3$ are both $CH_2$ can be formed by the reaction of diglyercol with diethyl carbonate, including using a basic catalyst. Similarly, a cyclic carbonate monomer having the structure of Formula (A2), such as a structure in which $R_2$ and $R_3$ are both $CH_2$ and $R_1$ is a bisphenolic alkane residue (e.g., $(C_6H_4)-C(Me)_2-(C_6H_4)$), may be formed by an addition reaction of carbon dioxide to diglycidyl compounds.

Additionally, in some embodiments described herein, a cyclic carbonate monomer can include one or more other curable or polymerizable moieties, in addition to the cyclic carbonate moieties of the monomer. For instance, in some cases, the cyclic carbonate monomer comprises one or more ethylenically unsaturated moieties, such as one or more (meth)acrylate moieties. Some such monomers can be a novel chemical species. Thus, in another aspect, novel dual-functional polymerizable species are described herein.

In some cases, the cyclic carbonate monomer has the structure of Formula (A14):

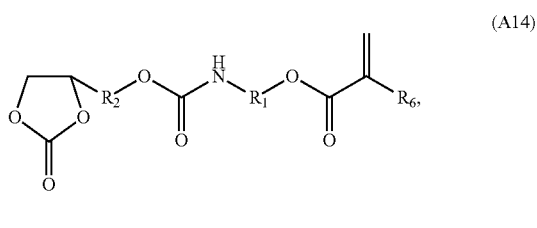

(A14)

wherein $R_1$ and $R_2$ are each independently a linear or branched C1-C36 alkyl or alkylene, alkenyl or alkenylene, aryl or arylene, or heteroaryl or heteroarylene moiety; and $R_6$ is H or $CH_3$. In some embodiments, for instance, $R_1$ is $CH_2CH_2$, $R_2$ is $CH_2$, and $R_6$ is $CH_3$. A monomer having the structure of Formula (A14) can be prepared according to the scheme illustrated in FIG. 1, or as described in Ochiai et al., *J. Polym. Sci., Part A: Polym. Chem.*, 2007, 45, 5781-5789.

In other instances, the cyclic carbonate monomer has the structure of Formula (A15) or the structure of Formula (A16):

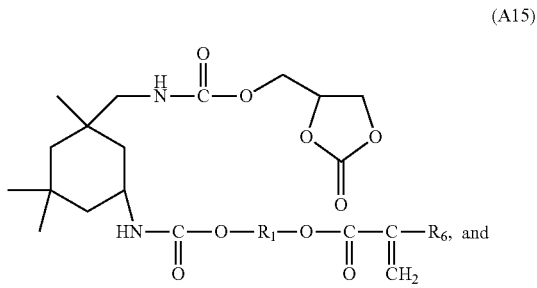

(A15)

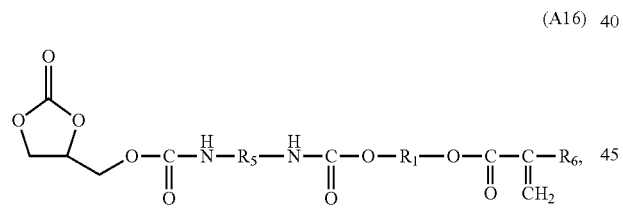

Figure 2:
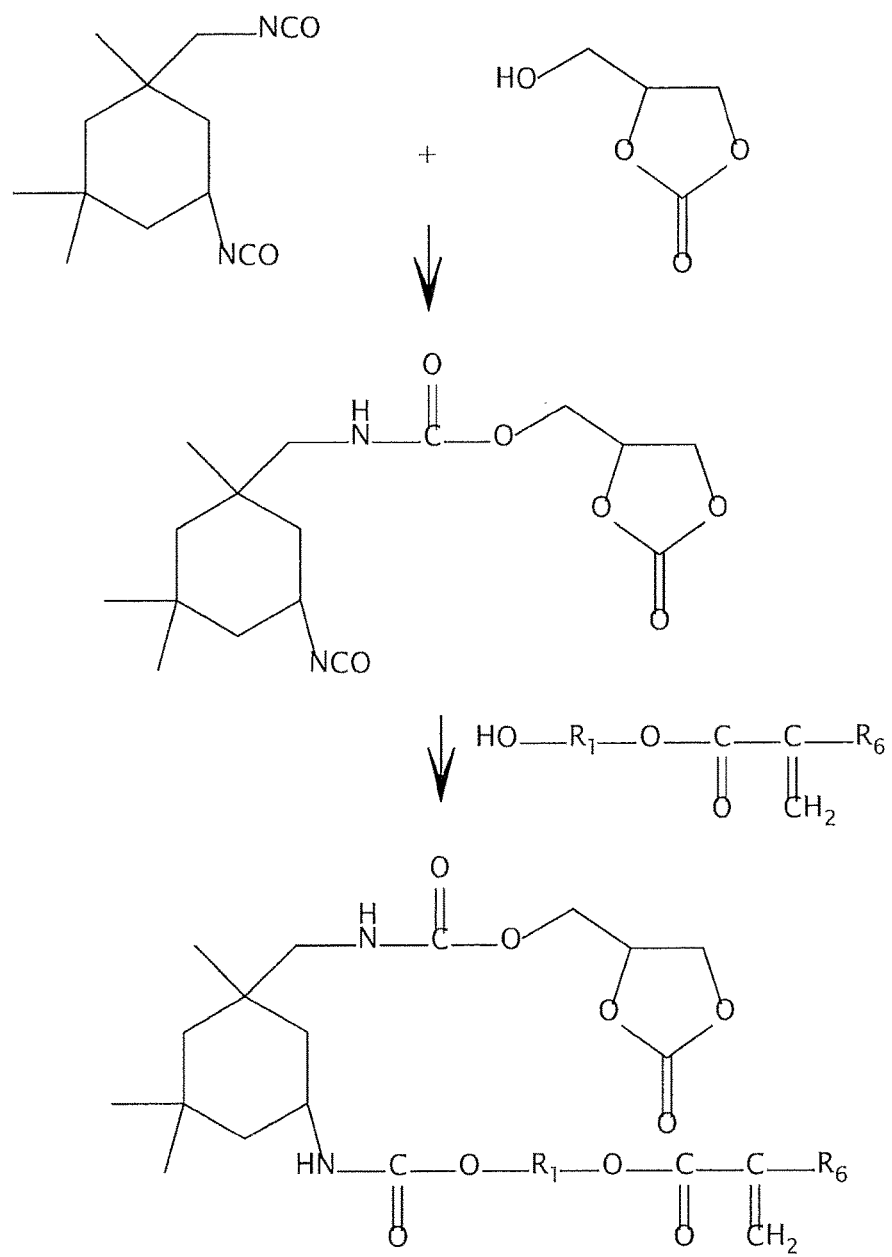
FIG. 2 illustrates a reaction scheme for forming a cyclic carbonate monomer suitable for use in an ink according to some embodiments described herein.

(A16)

wherein $R_1$ is a linear or branched C1-C36 alkyl or alkylene, alkenyl or alkenylene, aryl or arylene, or heteroaryl or heteroarylene moiety; $R_5$ is a linear or branched C2-C36 alkyl or alkylene, alkenyl or alkenylene, aryl or arylene, or heteroaryl or heteroarylene moiety; and $R_6$ is H or $CH_3$. For example, in some cases, $R_1$ is $CH_2CH_2$, $R_5$ is $(CH_2)_6$, and $R_6$ is $CH_3$. A monomer having the structure of Formula (A15) can be prepared according to the scheme illustrated in FIG. 2. A monomer having the structure of Formula (A16) can also be prepared according to the scheme of FIG. 2, except the specific cyclohexane-based diisocyanate starting material shown in FIG. 2 can be replaced by some other C2-C36 diisocyanate, such as 1,6-hexane diisocyanate.

In still other embodiments, the cyclic carbonate monomer of an ink described herein has the structure of Formula (A17) or the structure of Formula (A18):

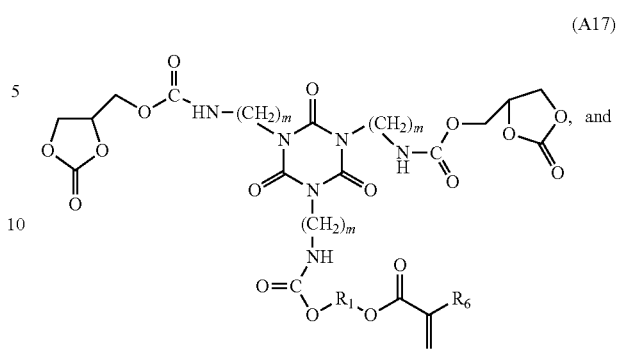

(A17)

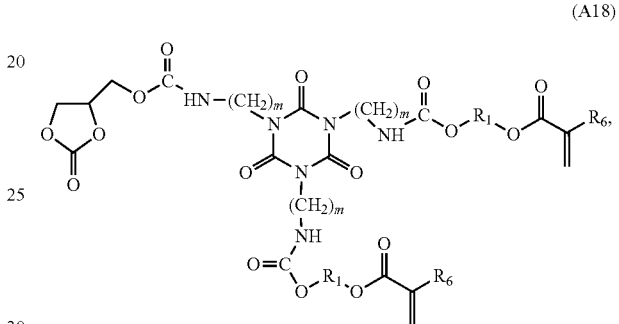

Figure 3:
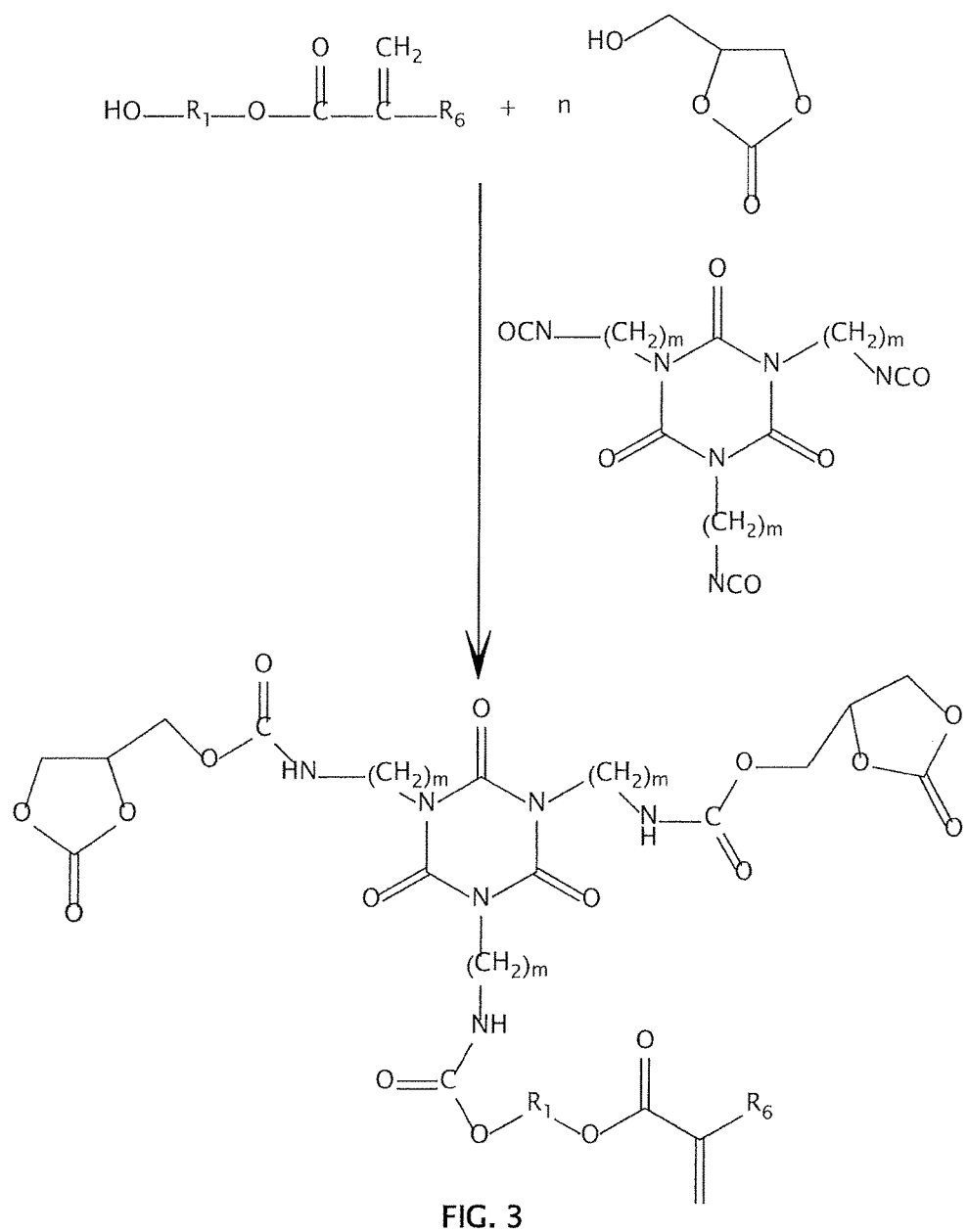
FIG. 3 illustrates a reaction scheme for forming a cyclic carbonate monomer suitable for use in an ink according to some embodiments described herein.

(A18)

wherein m is an integer from 1 to 36; $R_1$ is a linear or branched C1-C36 alkyl or alkylene, alkenyl or alkenylene, aryl or arylene, or heteroaryl or heteroarylene moiety; and $R_6$ is H or $CH_3$. For example, in some cases, m is 6, $R_1$ is $CH_2CH_2$, and $R_6$ is $CH_3$. A monomer having the structure of Formula (A17) can be prepared according to the scheme illustrated in FIG. 3. As illustrated in FIG. 3, the stoichiometry indicator n has a value of two (as indicated by the statistical product). However, n may generally have any value between 0.5 and 2. When n is 0.5, a monomer having the structure of Formula (A18) is provided.

Moreover, in some instances, the cyclic carbonate monomer has the structure of Formula (A19):

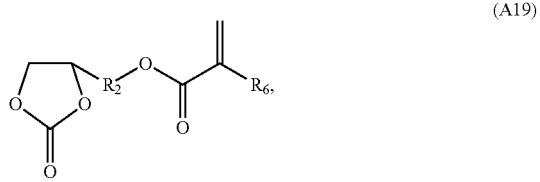

(A19)

wherein $R_2$ is a linear or branched C1-C20 alkyl or alkylene, alkenyl or alkenylene, aryl or arylene, or heteroaryl or heteroarylene moiety; and $R_6$ is H or $CH_3$. For example, in some embodiments, $R_2$ is $CH_2$ and $R_6$ is $CH_3$. Such a species can be obtained commercially from SPECIFIC POLYMERS (France) or prepared according to U.S. Pat. No. 7,414,127.

In other cases, the cyclic carbonate monomer has the structure of Formula (A20):

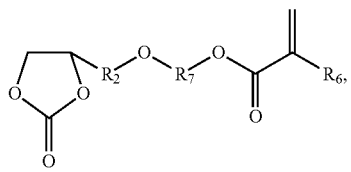

(A20)

wherein $R_2$ is a linear or branched C1-C20 alkyl or alkylene, alkenyl or alkenylene, aryl or arylene, or heteroaryl or heteroarylene moiety; $R_6$ is H or $CH_3$; $R_7$ is a linear or branched C1-C36 alkyl or alkylene, alkenyl or alkenylene, aryl or arylene, or heteroaryl or heteroarylene moiety, or $(CH_2CH(R_8)O)_n$; $R_8$ is H or $CH_3$; and n is an integer from 1 to 100. For instance, in some embodiments, $R_2$ is $CH_2$, $R_6$ is $CH_3$, and $R_7$ is $CH_2CH_2$. A monomer having the structure of Formula (A20) can be prepared according to U.S. Pat. No. 2,979,514.

Additionally, in some cases, the cyclic carbonate monomer has the structure of Formula (A21):

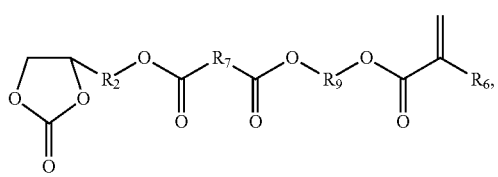

Figure 4:
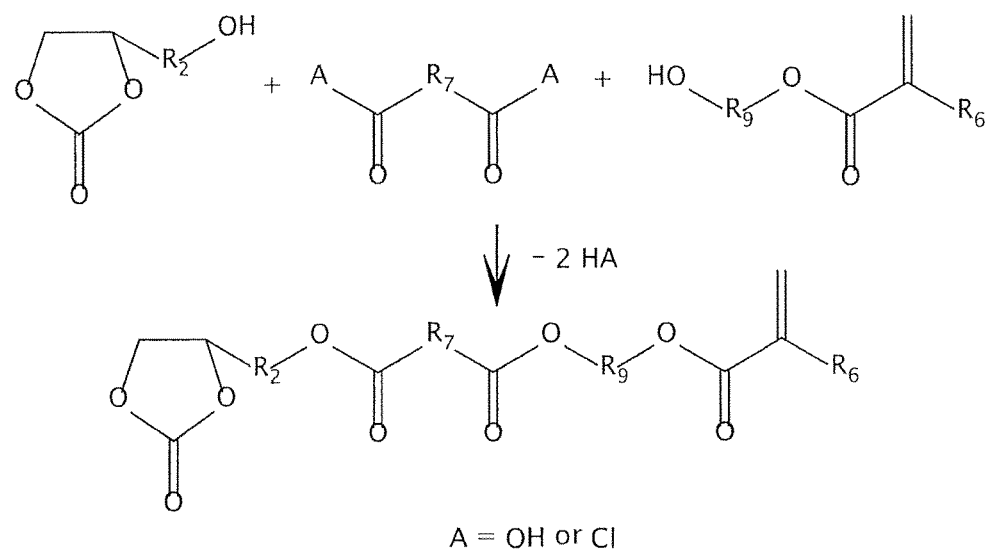
FIG. 4 illustrates a reaction scheme for forming a cyclic carbonate monomer suitable for use in an ink according to some embodiments described herein.

(A21)

wherein $R_2$ and $R_9$ are each independently a linear or branched C1-C36 alkyl or alkylene, alkenyl or alkenylene, aryl or arylene, or heteroaryl or heteroarylene moiety; $R_6$ is H or $CH_3$; $R_7$ is a linear or branched C1-C36 alkyl or alkylene, alkenyl or alkenylene, aryl or arylene, or heteroaryl or heteroarylene moiety, or $(CH_2CH(R_8)O)_n$; $R_8$ is H or $CH_3$; and n is an integer from 1 to 100. For example, in some embodiments, $R_2$ is $CH_2$, $R_6$ is $CH_3$, $R_7$ is $CH_2CH_2$, and $R_9$ is $CH_2CH_2$. A monomer having the structure of Formula (A21) can be prepared according to the scheme illustrated in FIG. 4.

Other cyclic carbonate monomers may also be used in an ink described herein. It is further to be understood that a cyclic carbonate monomer component of an ink described herein can comprise only one chemical species or a plurality of differing chemical species. For example, in some cases, the cyclic carbonate monomer of an ink described herein comprises a plurality of differing cyclic carbonate species.

Moreover, the cyclic carbonate monomer component, in total, can be present in an ink in any amount not inconsistent with the objectives of the present disclosure. For example, in some cases, an ink described herein comprises up to 70 wt. %, up to 60 wt. %, up to 50 wt. %, up to 40 wt. %, or up to 30 wt. % cyclic carbonate monomer, based on the total weight of the ink. In some instances, an ink comprises 10-70 wt. %, 10-60 wt. %, 10-50 wt. %, 10-40 wt. %, 10-30 wt. %, 20-60 wt. %, 20-50 wt. %, 30-70 wt. %, 30-60 wt. %, 30-50 wt. %, 40-70 wt. %, 40-60 wt. % cyclic carbonate monomer, based on the total weight of the ink.

Inks described herein also comprise an amine monomer. Any amine monomer not inconsistent with the objectives of the present disclosure may be used. For example, in some cases, the amine monomer comprises a plurality of amine moieties, such as two amine moieties or more than two amine moieties. In some instances, the amine monomer is an α,ω-diamine such as an amine monomer having the structure of Formula (B1):

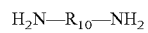 (B1), wherein $R_{10}$ is a linear or branched C1-C36 alkyl or alkylene, aryl or arylene, or heteroaryl or heteroarylene moiety.

An amine monomer described herein may also comprise at least one secondary or tertiary amine moiety. Other amine monomers may also be used in an ink described herein. It is further to be understood that an amine monomer component of an ink described herein can comprise only one chemical species or a plurality of differing chemical species. For example, in some cases, the amine monomer of an ink described herein comprises a plurality of differing amine species.

Moreover, the amine monomer component, in total, can be present in an ink in any amount not inconsistent with the objectives of the present disclosure. For example, in some cases, an ink described herein comprises up to 70 wt. %, up to 60 wt. %, up to 50 wt. %, up to 40 wt. %, or up to 30 wt. % amine monomer, based on the total weight of the ink. In some instances, an ink comprises 10-70 wt. %, 10-60 wt. %, 10-50 wt. %, 10-40 wt. %, 10-30 wt. %, 20-60 wt. %, 20-50 wt. %, 30-70 wt. %, 30-60 wt. %, 30-50 wt. %, 40-70 wt. %, 40-60 wt. % amine monomer, based on the total weight of the ink.

An ink described herein, in some cases, further comprises an additional curable material or monomer, other than the foregoing monomers. In particular, such a monomer can be different from or additional to the amine monomer and the cyclic carbonate monomer. Moreover, in some cases, the additional curable monomer can be polymerized separately from the cyclic carbonate and amine monomers of the ink. For instance, in some instances, the cyclic carbonate and amine monomers of the ink can react with one another to form a first polymer network, and the additional curable monomers of the ink can react with one another to form a second polymer network. In such cases, the first and second polymer networks can be separate or differing polymer networks. Additionally, in some embodiments, the first and second polymer networks can together form an interpenetrating polymer network. Moreover, the first and second polymer networks can be formed through differing polymerization processes.

An additional "curable material," for reference purposes herein, comprises a chemical species that includes one or more curable or polymerizable moieties, A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, UV radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum, such as wavelengths ranging from 450 nm to 650 nm.

Moreover, a polymerization reaction, in some cases, comprises a free radical polymerization reaction, such as that between points of unsaturation, including points of ethylenic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a curable or polymerizable moiety of an additional curable material or monomer described herein is an ethylenically unsaturated moiety, such as a vinyl moiety, allyl moiety, or (meth)acrylate moiety, where the term "(meth)acrylate" includes acrylate or methacrylate or a mixture or combination thereof. Thus, in some embodiments, the additional curable monomer of an ink described herein comprises a (meth)acrylate.

Further, an additional curable material described herein can be a monofunctional, difunctional, trifunctional, tetrafunctional, pentafunctional, or higher functional curable material. A "monofunctional" curable material, for reference purposes herein, comprises a chemical species that includes one curable or polymerizable moiety. Similarly, a "difunctional" curable material comprises a chemical species that includes two curable or polymerizable moieties; a "trifunctional" curable material comprises a chemical species that includes three curable or polymerizable moieties; a "tetrafunctional" curable material comprises a chemical species that includes four curable or polymerizable moieties; and a "pentafunctional" curable material comprises a chemical species that includes five curable or polymerizable moieties. Thus, in some embodiments, an additional monofunctional curable material of an ink described herein comprises a mono(meth)acrylate, a difunctional curable material of an ink described herein comprises a di(meth)acrylate, a trifunctional curable material of an ink described herein comprises a tri(meth)acrylate, a tetrafunctional curable material of an ink described herein comprises a tetra(meth)acrylate, and a pentafunctional curable material of an ink described herein comprises a penta(meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species or a relatively high molecular weight species. For example, a curable material can comprise or be either a "monomeric" or molecular species (i.e., a species that is itself not a polymer or oligomer, that is a relatively low molecular weight species, or that is a relatively low viscosity species), or an "oligomeric" species (i.e., a species that is itself a polymer or oligomer, that is a relatively high molecular weight species, or that is a relatively high viscosity species) that is capable of undergoing additional polymerization, such as through one or more points of unsaturation described herein. Thus, in some cases, a population of "monomeric" or molecular species in a curable material can have a consistent or well-defined molecular structure and/or formula throughout the population (such as may be exhibited, for instance, by a specified mass of ethoxylated (4) bisphenol A diacrylate). In contrast, a population of "oligomeric" species in a curable material can have a varying molecular structure and/or formula throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). Further, the weight average molecular weight of an "oligomeric" curable material can generally be in the range from about 400 to 10,000, from about 600 to 10,000, or from about 500 to 7,000. The molecular weight of a "monomeric" curable material, in contrast, can generally be below 600, below 500, below 400, below 300, below 200, or below 100. Additionally, in some embodiments, a "monomeric" curable material has a viscosity of 500 centipoise (cP) or less at 25° C., when measured according to ASTM D2983, while an "oligomeric" curable material has a viscosity of 1000 cP or more at 25° C., when measured according to ASTM D2983.

In general, any monomeric curable material not inconsistent with the objectives of the present disclosure may be used in an additional curable monomer of an ink. In some cases, the additional curable monomer comprises one or more species of (meth)acrylates, such as one or more monofunctional, difunctional, trifunctional, tetrafunctional (meth)acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, or bisphenol S. A curable material described herein may also comprise 1,1-trimethylolpropane tri(meth) acrylate, pentaerythritol monohydroxy tri(meth)acrylate, dipentaerythritol monohydroxy penta(meth)acrylate, and/or bis(trimethylolpropane) tetra(meth)acrylate. Further, in some cases, a curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Additional non-limiting examples of commercially available monomeric curable materials useful in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; and dipentaerythritol pentaacrylate, commercially available from SARTOMER under the trade name SR 399 LV. Other commercially available monomeric curable materials may also be used.

In addition, any oligomeric curable material not inconsistent with the objectives of the present disclosure may be used in an ink described herein. In some cases, for instance, the additional curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono (meth)acrylate or polyethylene glycol mono(meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; and aliphatic urethane diacrylate, commercially available from ALLNEX under the trade name EBECRYL 8402. Other commercially available oligomeric curable materials may also be used.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

It is to be understood that, when both an oligomeric curable material and a monomeric curable material are included as an additional monomer of an ink described herein, the ratio of oligomeric curable material to monomeric curable material in an ink described herein can be selected to provide an ink having a viscosity suitable for use in a desired 3D printing system, such as a 3D printing system using a piezoelectric print head to dispense inks, or a stereolithography 3D printing system.

Moreover, an additional curable material can be present in an ink described herein in any amount not inconsistent with the objectives of the present disclosure. In some cases, the additional curable material, in total, is present in an amount up to about 80 wt. %, up to about 70 wt. %, up to about 60 wt. %, or up to about 50 wt. %, up to about 40 wt. %, up to about 30 wt. %, or up to about 20 wt. %, based on the total weight of the ink. In some cases, an ink described herein comprises about 5-70 wt. % additional curable material, based on the total weight of the ink. In some embodiments, an ink comprises about 10-60 wt. %, 10-50 wt. %, 10-60 wt. %, 10-50 wt. %, 10-40 wt. %, 15-70 wt. %, 15-50 wt. %, 15-30 wt. %, 20-70 wt. %, 20-50 wt. %, 20-40 wt. %, or 30-60 wt. % additional curable material, based on the total weight of the ink.

As described hereinabove, 3D printing may be carried out according to the present disclosure using a single ink capable of forming a polymer or oligomer from a cyclic carbonate and an amine, or using a single ink that is also capable of forming an additional polymer or oligomer from an additional curable material, such as a (meth)acrylate monomer. However, it is also possible to carry out 3D printing using a combination of differing inks that, when combined, are capable of forming a polymer or oligomer from a cyclic carbonate and an amine, and optionally also from an additional curable material such as a (meth)acrylate. Thus, in another aspect, kits for use in a 3D printing system are described herein. In some embodiments, such a kit comprises a first ink comprising a cyclic carbonate monomer and a second ink comprising an amine monomer. Moreover, in some cases, the first ink and/or the second ink further comprises an additional curable material (other than the cyclic carbonate and amine monomers), such as an ethylenically unsaturated monomer. In some instances, the ethylenically unsaturated monomer comprises a (meth)acrylate. Further, as described further hereinbelow, the first ink and/or the second ink may also comprise a photoinitiator.

It is to be understood that the cyclic carbonate monomer, amine monomer, ethylenically unsaturated monomer (or other additional curable material), and photoinitiator of a kit described herein can comprise any cyclic carbonate monomer, amine monomer, ethylenically unsaturated monomer (or other additional curable material), and photoinitiator described herein for a "single" ink. Additionally, it is further to be understood that the first or second ink of a kit described herein can include a plurality or mixture of cyclic carbonate species, a plurality or mixture of amine species, a plurality or mixture of ethylenically unsaturated species (or other additional curable materials), and/or a plurality or mixture of photoinitiators. In general, any combination or mixture of differing cyclic carbonate species, amine species, ethylenically unsaturated species (or other additional curable materials), and/or photoinitiators described herein may be used in a first ink and/or a second ink of a kit described herein. However, in some cases, an ink described herein does not comprise both a primary or secondary amine species and also an ethylenically unsaturated species such as a (meth) acrylate.

Moreover, the inks of a kit described herein may be used simultaneously or sequentially in a 3D printing process. Additionally, when at least one ink of a kit comprises an additional curable material such as a (meth)acrylate, the inks of the kit can together provide differing curable materials that form differing polymer networks. In some such instances, the differing curable materials and/or polymer networks of the differing inks of a kit can be cured in a temporally separated manner and/or a spatially separated manner within the geometry of the 3D article. For example, in some embodiments, a curable material of the first (and/or second) ink can be cured during printing of the 3D article to provide a printed article having sufficient green strength to be handled and/or to exhibit a desired feature resolution, and a different curable material of the second (and/or first) ink can be cured following printing, such as by placing the article in an oven for thermal curing of the second curable material. Similarly, in other cases, a curable material of the first ink cures or polymerizes within a first region of the printed 3D article, and a curable material of the second ink cures or polymerizes within a second region of the printed 3D article.

In addition, the two inks of a kit described herein can be used in separate ink dispensers or "channels" of a 3D printing system during 3D printing, or may be combined to form a single composition for forming a 3D article, as described further hereinbelow. Further, it is to be understood that a "channel" of a 3D printing system can refer to a mechanism for depositing a single material from an ink dispenser such as a print head. For example, a channel of a print head can refer to a specific material ejection orifice of a print head, alone or in combination with any material conduits, material storage compartments, and/or other hardware or software of a 3D printing system associated with the specific material ejection orifice. A channel can also refer to an entire print head dedicated to printing a single, specific material, alone or in combination with any material conduits, material storage compartments, and/or other hardware or software of a 3D printing system associated with printing the single, specific material from the channel.

Turning again to specific components of inks described herein, inks described herein can further comprise one or more components in addition to the monomers and curable materials described hereinabove. For instance, an ink described herein can further comprise a colorant, such as a molecular dye, a particulate inorganic pigment, or a particulate organic colorant. An ink described herein may also comprise one or more additives selected from the group consisting of inhibitors and stabilizing agents. Further, an ink described herein can include one or more photoinitiators and/or one or more photosensitizers. Moreover, it is to be understood that any ink described herein may include such additional components, whether the ink is part of a kit described herein or is not part of a kit described herein.

An ink can comprise any colorant not inconsistent with the objectives of the present disclosure. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. In some instances, one or more colorants of an ink described herein exhibits a white color. In other cases, a colorant exhibits a black color. Some non-limiting examples of colorants suitable for use in some embodiments described herein include SUN UVDJ107, SUN UVDJ150, SUN UVDJ322, SUN UVDJ350, SUN UVDJ354, RJA 03010-FX-Y150, RJA D3410-FX-Y150, RJA D3410-FX-K, PENN COLOR 9B898, and PENN COLOR 96989. Moreover, in some cases, a particulate colorant described herein has an average particle size of less than about 5 µm, or less than about 1 µm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink.

Moreover, inks described herein, in some embodiments, further comprise one or more polymerization inhibitors and/or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

An ink described herein may also comprise one or more photoinitiators. Any photoinitiator not inconsistent with the objectives of the present disclosure may be used. In some cases, a photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-1 2-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyl-diphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of photoinitiator that may be included in an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 wt. %, based on the total weight of the ink. In some cases, a photoinitiator is present in an amount ranging from about 0.1 wt. % to about 5 wt. %.

Additionally, in some embodiments, an ink described herein further comprises one or more photosensitizers. In general, such a sensitizer can be added to an ink to increase the effectiveness of one or more photoinitiators that may also be present. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the ink.

Additionally, in some cases, an ink described herein is further characterized by components that are not included in the ink, or that are included in only small amounts. For instance, in some embodiments, an ink described herein is free or substantially free of non-curable photoinitiators, including non-curable photoinitiators described hereinabove. An ink that is "substantially" free of non-curable photoinitiator, or from which non-curable photoinitiator has been "substantially" excluded, as used herein, can comprise less than about 1 wt. %, less than about 0.5 wt. %, less than about 0.1 wt. %, less than about 0.07 wt. %, less than about 0.05 wt. %, or less than about 0.01 wt. % non-curable photoinitiator, based on the total weight of the ink. Thus, in some cases, an ink described herein comprises 0-0.5 wt. %, 0-0.1 wt. %, 0-0.07 wt. %, 0-0.05 wt. %, or 0-0.01 wt. % non-curable photoinitiator, based on the total weight of the ink. Moreover, a "non-curable" photoinitiator, as used herein, can include any photoinitiator that does not include a moiety that can be polymerized or cured with the curable materials of the ink, such as an ethylenically unsaturated moiety. For instance, in some cases, a non-curable photoinitiator does not comprise a (meth)acrylate moiety.

Inks described herein can exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C. or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in some 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state. Solidification of an ink can also occur due to curing of the ink.

Additionally, in some embodiments, an ink described herein, when non-cured, has a viscosity profile consistent with the requirements and parameters of one or more 3D printing systems, such as a multi-jet modeling or stereolithography system. In some cases, for example, an ink described herein has a dynamic viscosity ranging from about 8.0 cP to about 14.0 cP or from about 9.0 to about 14.0 cP at a jetting temperature of the system, such as a temperature of about 80° C., when measured according to ASTM standard D2983 (e.g., using a Brookfield Model DV-II+ Viscometer). In some embodiments, an ink has a dynamic viscosity of about 9.5-12.5 cP or about 10.5-12.5 cP at a temperature of about 80° C. In some cases, an ink has a viscosity of about 8.0-10.0 cP at a temperature of about 85-87° C. In some embodiments, an ink described herein has a dynamic viscosity of about 8.0-19.0 cP, about 8.0-13.5 cP, about 11.0-14.0 cP, about 11.5-13.5 cP, or about 12.0-13.0 cP at a temperature of about 65° C., when measured according to ASTM D2983. In other instances, an ink described herein when non-cured exhibits a dynamic viscosity of about 200-2000 cP, about 200-900 cP, about 300-900 cP, about 300-800 cP, about 400-1000 cP, about 400-900 cP, about 400-800 cP, about 400-600 cP, about 450-550 cP, about 500-700 cP, about 500-600 cP, or about 500-550 cP at 30° C., when measured according to ASTM D2983. In some cases, an ink described herein when non-cured exhibits a dynamic viscosity of less than about 100 cP or more than about 1000 cP, when measured according to ASTM D2983.

Further, inks described herein, in some embodiments, can exhibit a combination of one or more desirable features. In some cases, for instance, an ink in the non-cured state has one or more of the following properties:

1. Freezing point below about 30° C., below about 25° C., or below about 15° C.;
2. Viscosity of about 9-14 cP at 70-95° C. or about 400-1000 cP at 25-35° C.; and 3. Thermal stability for at least 6 months at room temperature (25° C.).

As described above, viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., room temperature) at the beginning and at the end of the time period. In some embodiments, the viscosity change is no greater than about 30 percent or no greater than about 20 percent, based on the larger viscosity value. In some cases, the viscosity change is between about 10 percent and about 20 percent or between about 25 percent and about 30 percent. Moreover, in some embodiments, the change in viscosity is an increase in viscosity.

Inks described herein can also exhibit a variety of desirable properties, in addition to those described hereinabove in a cured state or in a "green" state. An ink in a "cured" state, as used herein, comprises an ink that includes a curable material or polymerizable component that has been at least partially polymerized and/or cross-linked or that has been largely polymerized and/or cross-linked. For instance, in some cases, a cured ink is at least about 51% polymerized or cross-linked or at least about 60% polymerized or cross-linked. In some embodiments, a cured ink is at least about 70%, at least about 80%, at least about 90%, or at least about 95% polymerized or cross-linked. In some instances, a cured ink is between about 50% and about 99% polymerized or cross-linked. An ink in a "green" state can be less than 50%, less than 40%, less than 30%, or less than 20% polymerized or cross-linked. In some cases, an ink in a green state is 5-50%, 5-40%, 5-30%, 10-50%, 10-40%, 10-30%, 20-50%, 20-40%, 30-50%, or 30-40% polymerized or cross-linked. Moreover, as understood by one of ordinary skill in the art, a "green" state of an ink can be defined as the state of the ink during or after a layer-by-layer 3D printing process described herein but before a post-processing curing step has been performed.

In some cases, an ink described herein, when cured or in a green state, has an elongation at break of about 10-400%, 10-300%, 10-200%, 10-100%, 10-8-%, 10-40%, 10-30%, 10-20%, 15-400%, 15-300%, 15-100%, 15-30%, 50-400%, 50-300%, 50-200%, 50-100%, 100-400%, 100-300%, 100-200%, 200-400, 200-300%, or 300-400%, when measured according to ASTM D638.

Further, a cured or green ink described herein, in some cases, can have a tensile strength of about 3500-7000 psi or about 4000-6000 psi, when measured according to ASTM D638. Additionally, a cured or green ink described herein, in some embodiments, can have a tensile modulus of about 100-400 ksi or about 150-300 ksi, when measured according to ASTM D638.

An ink described herein can also exhibit high biocompatibility and/or low cytotoxicity, including in a cured state. For instance, in some cases, an ink described herein, when cured, exhibits a cytotoxicity grade below 2 when measured according to ANSI/AAMI/ISO 10993-5:2009. In some embodiments, an ink described herein, when cured, exhibits a cytotoxicity grade of 0 or 1 when measured according to ANSI/AAMI/ISO 10993-5:2009.

Moreover, in some cases, an ink described herein, when cured, can exhibit a plurality of the foregoing properties. For example, in some embodiments, an ink when cured has a tensile strength of about 4000-6000 psi when measured according to ASTM D638; a tensile modulus of about 150-300 ksi when measured according to ASTM D638; an elongation at break of about 10-400% when measured according to ASTM D638; and a cytotoxicity grade of 0 or 1 when measured according to ANSI/AAMI/ISO 10993-5:2009.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system. In other instances, the components of an ink are mixed at ambient temperature (e.g., 20-25° C.), without heating, or with minimal heating (e.g., to a temperature of 30-45° C.). Such a method can still include filtering the resulting liquid mixture.

II. Uses of Compositions for 3D Printing

In another aspect, uses of a composition for 3D printing are described herein, wherein the composition comprises an ink or kit described hereinabove. For instance, in some cases, a use of a composition for 3D printing is described herein, wherein the composition comprises an ink comprising a cyclic carbonate monomer and an amine monomer. However, any ink or plurality of inks described hereinabove in Section I may be used for 3D printing.

III. 3D Printing Systems

In still another aspect, 3D printing systems are described herein. Such a 3D printing system can use or comprise a composition for 3D printing described hereinabove, such as a composition comprising an ink, plurality of inks, or kit described hereinabove. In some embodiments, a 3D printing system described herein comprises a 3D printer having at least one of an ink dispenser and an ink reservoir, and an ink described herein disposed in the ink dispenser, the ink reservoir, or both. The ink comprises, consists of, or consists essentially of any ink described hereinabove in Section I. Additionally, in some cases, a 3D printing system described herein comprises a 3D printer having a first ink dispenser and a second ink dispenser, a first ink disposed in the first ink dispenser, and a second ink disposed in the second ink dispenser. The first ink and the second ink each comprise, consist of, or consist essentially of a first ink and a second ink described hereinabove in Section I.

In general, any 3D printer not inconsistent with the objectives of the present disclosure may contain or include an ink described herein, including in an ink dispenser and/or reservoir. In some embodiments, for example, the 3D printer comprises an inkjet or so-called multi-jet modeling (MjM) type 3D printer. In other instances, the 3D printer comprises a stereolithography (SLA) type 3D printer, a digital light processing (DLP) type 3D printer, or a contacted SLA (cSLA) type printer. Other 3D printers may also be used.

IV. Methods of Printing a 3D Article

In another aspect, methods of printing a 3D article or object are described herein. Methods of printing a 3D article or object described herein can include forming the 3D article from a plurality of layers of an ink described herein in a layer-by-layer manner. Any ink described hereinabove in Section I may be used. For example, in some cases, the ink comprises a cyclic carbonate monomer and an amine monomer. Other inks described herein may also be used. Moreover, in some cases, a method described herein comprises selectively depositing layers of the ink in a fluid state onto a substrate.

Additionally, a method described herein can further comprise curing or polymerizing one or more curable materials of the ink, such as the cyclic carbonate monomer and the amine monomer of the ink. Moreover, when an ink comprises a plurality of differing curable materials, the differing curable materials can be cured or polymerized in separate curing or polymerization steps carried out at different time periods and/or in different spatial regions of a layer of ink. Further, differing curable materials can be cured in different manners.

For instance, in some cases, an ink used in a method described herein comprises a cyclic carbonate monomer, an amine monomer, and one or more additional (meth)acrylates. In addition, in some such cases, the cyclic carbonate monomer comprises a (meth)acrylate moiety in addition to comprising one or more cyclic carbonate moieties, respectively. In such instances, a method described herein comprises curing or polymerizing the ethylenically unsaturated moieties of one or more of the (meth)acrylates (and, if present, the (meth)acrylate moiety of the cyclic carbonate) to form a poly(meth)acrylate. For example, the (meth)acrylates can be cured or polymerized with UV light. Further, in some embodiments, the method further comprises thermally curing or polymerizing the cyclic carbonate monomer and the amine monomer. Such curing or polymerizing can comprise reacting the cyclic carbonate monomer with the amine monomer to form a polyurethane. Moreover, in some cases, the polyurethane and the poly(meth)acrylate can together form an interpenetrating polymer network.

Curing one or more curable materials or monomers described herein can be carried out in any manner not inconsistent with the objectives of the present disclosure. For example, in some instances, a layer of deposited ink can be cured (by at least one method or curing mechanism) prior to the deposition of another or adjacent layer of ink. In some cases, a method of printing a 3D article described herein further comprises subjecting the ink to electromagnetic radiation of sufficient wavelength and intensity to cure at least one curable material of the ink, where curing can comprise polymerizing one or more polymerizable moieties or functional groups of one or more components of the at least one curable material. Additionally, as described above, curing one or more layers of deposited ink, in some embodiments, is carried out by exposing the one or more layers to electromagnetic radiation, such as UV light or visible light.

Similarly, curing can also be carried out thermally. In some embodiments, thermal curing is carried out using thermal energy or heat provided by a photocuring step described herein, including thermal energy released by the photoinitiated polymerization of one or more (meth)acrylates or other ethylenically unsaturated monomers. Thermal curing can also be carried out by heating the ink (or an article formed from the ink) using a source of thermal energy such as an oven.

Moreover, it is further to be understood that a deposited ink (or a component thereof) can be cured according to a second curing mechanism after curing an ink according to a first curing mechanism, and/or after completing the printing of the 3D article. For instance, in some cases, one or more deposited inks can be cured by UV light in a layer-by-layer manner during layer-by-layer printing of the article, and then subsequently cured in some other manner following completion of layer-by-layer printing. In some such embodiments, subsequently curing the one or more deposited inks comprises thermally curing the one or more inks by heating the article. In some cases, the article is heated in a "post-processing" step, such as by placing a previously formed article in an oven or other space at an elevated temperature. In some such instances, the article can be heated at a temperature and for a time period sufficient to cure a previously uncured curable component of an ink from which the article is formed, as opposed to being heated at a lower temperature and/or for a shorter time period, such as may be used to melt a support material off or away from a completed 3D article. However, in some instances, a support material, if present, may be melted off a completed 3D article at the same time as thermal curing of a curable component of the ink. In addition, in some cases, a thermal curing step is not carried out as a post-processing step but is instead carried out during layer-by-layer printing of the article, as described above.

A method of printing a 3D article described herein can also comprise forming the 3D article from a plurality of layers of a plurality of inks described herein in a layer-by-layer manner. For instance, in some embodiments, a method comprises forming the 3D article from a plurality of layers of a first ink and a plurality of layers of a second ink. In some such cases, a method of printing a 3D article comprises selectively depositing layers of a first ink in a fluid state onto a substrate and selectively depositing layers of a second ink in a fluid state onto the substrate, wherein the first ink and the second ink respectively comprise a first ink and a second ink described hereinabove in Section I. For example, the first ink can comprise a cyclic carbonate monomer and the second ink can comprise an amine monomer.

As with "single" inks, methods described herein using a plurality of differing inks can also comprise curing a plurality of curable materials of the inks, including in separate curing steps carried out at different time periods and/or in different spatial regions of a layer of one or more inks. Moreover, as described further herein, different curable materials can be cured in different manners. For example, in some embodiments, the first ink comprises one or more ethylenically unsaturated monomers in addition to the cyclic carbonate monomer, and the method further comprises curing the ethylenically unsaturated monomers of the first ink with UV light and subsequently thermally curing the cyclic carbonate and the amine monomers.

Further, the layers of an ink can be deposited according to an image of the 3D article in a computer readable format. In some embodiments, an ink is deposited according to preselected computer aided design (CAD) parameters. Moreover, in some cases, one or more layers of an ink described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called multi-jet modeling or stereolithography 3D printing methods. For example, in some instances, a multi-jet method of printing a 3D article comprises selectively depositing layers of one or more inks described herein in a fluid state onto a substrate, such as a build pad of a 3D printing system. In addition, in some embodiments, a method described herein further comprises supporting at least one of the layers of the one or more inks with a support material. Any support material not inconsistent with the objectives of the present disclosure may be used.

Further, in some embodiments, a preselected amount of ink described herein is heated to the appropriate temperature and jetted through the print head or a plurality of print heads of a suitable inkjet printer to form a layer on a print pad in a print chamber. In some cases, each layer of ink is deposited according to the preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization.

Layered deposition of the ink and support material can be repeated until the 3D article has been formed. In some embodiments, a method of printing a 3D article further comprises removing the support material from the ink.

It is also possible to form a 3D article from an ink described herein using stereolithography (SLA), contacted SLA (cSLA), or digital light processing (DLP) 3D printing. For example, in some cases, a method of printing a 3D article comprises retaining one or more inks described herein in a fluid state in a container and selectively applying energy to the one or more inks in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, selectively applying energy to the ink in the container can comprise applying electromagnetic radiation, such as UV radiation or visible radiation, having a sufficient energy to cure the ink. In some instances, the UV light has an average wavelength of 320-380 nm, 340-370 nm, or 350-360 nm. In some cases, the curing radiation is provided by a computer controlled laser beam or a DLP light source or projector. In addition, in some instances, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution. The "feature resolution" of an article, for reference purposes herein, can be the smallest controllable physical feature size of the article. The feature resolution of an article can be described in terms of a unit of distance such as microns ($\mu m$), or in terms of dots per inch (dpi). As understood by one of ordinary skill in the art, a higher feature resolution corresponds to a higher dpi value but a lower distance value in $\mu m$. In some cases, an article formed by depositing or solidifying an ink described herein can have a feature resolution of about 500 $\mu m$ or less, about 200 $\mu m$ or less, about 100 $\mu m$ or less, or about 50 $\mu m$ or less, including at elevated temperatures. In some embodiments, an article has a feature resolution between about 50 $\mu m$ and about 500 $\mu m$, between about 50 $\mu m$ and about 200 $\mu m$, between about 50 $\mu m$ and about 100 $\mu m$, or between about 100 $\mu m$ and about 200 $\mu m$. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

V. Printed 3D Articles

In another aspect, printed 3D articles are described herein. In some embodiments, a printed 3D article is formed from one or more inks described herein. Any ink described hereinabove in Section I may be used. For example, in some cases, the 3D article is formed from a single ink described herein, such as an ink comprising a cyclic carbonate monomer, an amine monomer, and one or more additional ethylenically unsaturated monomers such as one or more additional (meth)acrylates. Moreover, the cyclic carbonate monomer and the amine monomer, when cured, can together form a polyurethane. Similarly, the one or more (meth) acrylates, when cured, can form a poly(meth)acrylate. In some such cases, the polyurethane and the poly(meth) acrylate together form an interpenetrating polymer network.

A printed 3D article described herein may also be formed from a plurality of differing inks. For instance, in some embodiments, a printed 3D article is formed from a first ink and a second ink described hereinabove in Section I. In some such cases, the first ink comprises a cyclic carbonate monomer and the second ink comprises an amine monomer. The first and/or second ink may also comprise a second curable material, in addition to the cyclic carbonate and/or amine monomers. Such a second curable material of the first ink, in some cases, comprises one or more (meth)acrylates or other ethylenically unsaturated monomers. Additionally, as described hereinabove, such a second curable material of a first or second ink can form a polymer network (e.g., a poly(meth)acrylate) that differs from the polymer network (e.g., the polyurethane) formed by the cyclic carbonate and amine monomers. Additionally, in some instances, the two polymer networks together form an interpenetrating polymer network.

VI. Adhesives and Coatings

Inks, kits, systems, and methods for 3D printing have been described herein. However, in another aspect, compositions are also described herein for applications other than 3D printing. In particular, compositions are described herein for adhesive and/or coating applications.

In particular, in some embodiments, an adhesive is described herein, wherein the adhesive comprises a cyclic carbonate monomer described hereinabove, such as a cyclic carbonate having one or more cyclic carbonate moieties and one or more ethylenically unsaturated moieties. In some cases, the one or more ethylenically unsaturated moieties comprise a (meth)acrylate moiety. For example, in some instances, the cyclic carbonate has the structure of Formula (A15), Formula (A16), Formula (A17), or Formula (A18). Moreover, an adhesive or adhesive composition described herein, in some embodiments, further comprises one or more components in addition to the cyclic carbonate species. In some cases, for instance, the adhesive or adhesive composition further comprises a solvent, such as a polar or non-polar, hydrophobic or hydrophilic, aqueous or organic solvent.

In another aspect, coatings and coated substrates or apparatuses are described herein. In some such embodiments, for example, an apparatus comprises a substrate and a coating disposed on or over the substrate, wherein the coating comprises a composition described hereinabove. In particular, in some cases, the coating comprises or is formed from a cyclic carbonate species described herein, such as a cyclic carbonate having one or more cyclic carbonate moieties and one or more ethylenically unsaturated moieties. In some embodiments, the one or more ethylenically unsaturated moieties comprise a (meth)acrylate moiety. In some instances, the cyclic carbonate has the structure of Formula (A15), Formula (A16), Formula (A17), or Formula (A18). In addition, the substrate of such a coated apparatus can be formed from any material not inconsistent with the objectives of the present disclosure. In some cases, for example, the substrate comprises or is formed from an organic material such as a thermoplastic material or another organic polymeric material. In other instances, the substrate comprises or is formed from an inorganic material such as a metal, metal oxide, or glass. A coated substrate described herein can also comprise or be formed from a composite material, including an organic-inorganic composite material, such as a fiberglass material.

Some embodiments described herein are further illustrated in the following non-limiting examples.

EXAMPLE 1

Cyclic Carbonate Monomer

A cyclic carbonate monomer having the structure of Formula (A11), wherein $R_1$ is $(CH_2)_8$, was prepared as follows. To a 500 mL 3-necked round bottom flask with Teflon® coated large football-shaped stir magnet, constant pressure addition funnel and condenser was added 12.0 grams of sebacoyl chloride (SebCl), 10.4 grams of triethylamine, and 80 grams of methyltetrahydrofuran (mTHF) solvent. This flask was placed in a 190×100 Pyrex® (2.5 L)

crystallizing dish filled with ice-water and allowed to stir/cool for about 30 min. To the 150 mL constant pressure addition funnel was added 11.8 grams of glycerol carbonate and 20 grams mTHF, followed by gentle swirling until the solid glycerol carbonate dissolved. The glycerol carbonate solution was added dropwise to the cooled sebacoyl chloride solution over a 30 minute period of time. Additional mTHF was added during the subsequent reaction to facilitate stirring. Stirring continued for approximately two days. The final mixture was worked up by carrying out a filtration using a vacuum flask and Buchner funnel equipped with silica gel. The clear liquid that was collected in the vacuum flask was subjected to rotary evaporation to obtain a clear viscous product.

EXAMPLE 2

Cyclic Carbonate Monomers

Cyclic carbonate monomers having the structure of Formula (A14), wherein $R_1$ is $(CH_2)_2$, $R_2$ is $CH_2$, and $R_6$ is either $CH_3$ or H, were prepared as follows. For $R_6$=$CH_3$, to a 2000 mL beaker with Teflon® coated large football-shaped stir magnet, was added 620.6 grams of isocyanatoethyl methacrylate (obtained from Synasia, Nantong, China). The solution was then stirred and heated in a silicon oil bath of 60° C. A mixture of 476.7 grams of glycerin carbonate (obtained from Huntsman Chemical) and 0.16 grams dibutyltin dilaurate (obtained from Sigmal Aldrich) was gradually added to the heated isocyanatoethyl methacrylate while maintaining the temperature of the reaction between 50° C. and 80° C. After all of the mixture was added, 0.48 grams of BHT (obtained from Sigma-Aldrich) was added, and the resultant solution was stirred at 70-80° C. for another 16 hrs. The resultant product was a clear, viscous liquid, showing no isocyanate peaks by FT-IR. For $R_6$=H, a similar procedure was used, but isocyanatoethyl methacrylate was replaced with a stoichiometrically equivalent amount of isocyanatoethyl acrylate (obtained from Synasia, Nantong, China).

EXAMPLE 3

Cyclic Carbonate Monomer

A cyclic carbonate monomer having the structure of Formula (A15) was prepared as follows. To a 500 mL beaker with a Teflon® coated large football-shaped stir magnet, were added 55.57 grams of isophonyl diisocyanate (obtained from Sima-Aldrich), isobornyl methacrylate (IBOMA, obtained from Evonik Industries), and 0.02 grams of dibutyltin dilaurate (obtained from Sigma Aldrich). The solution was stirred and heated in a silicon oil bath at 55-60° C. Next, 29.5 grams of glycerin carbonate (obtained from Huntsman Chemical) was gradually added over 30 min. while maintaining the temperature of the reaction between 50° C. and 80° C. After all of glycerin carbonate was added, 0.04 grams of BHT (obtained from Sigma-Aldrich) was added, and the resultant solution was stirred at 60-70° C. for another 1 hr. Then, 32.53 grams of hydroxylethyl methacrylate (obtained from Sigma-Aldrich) was added gradually over 0.2 hr and the resultant solution was stirred at 60-70° C. for another 16 hrs. The product was a clear, viscous liquid, showing no isocyanate peaks by FT-IR.

EXAMPLE 4

Cyclic Carbonate Monomer

A cyclic carbonate monomer having the structure of Formula (A13), wherein $R_2$ and $R_3$ are each $(CH_2)_2$, was prepared as follows. To a 1000 mL glass beaker was added a Teflon® coated large football-shaped stir magnet, 47.2 grams of glycerol carbonate (GC), 415 grams of triethylamine, and 135 grams of tetrahydrofuran (THF) solvent. The beaker was covered with a watch glass and placed in a 190×100, 2.5 L Pyrex® crystallizing dish filled with ice-water and allowed to stir/cool for about 30 min. To an additional 250 mL beaker was added a Teflon® coated stir magnet, 46.2 grams of diethyleneglycol-bischloroformate (DEGBCF), and 70 grams of ethyl alcohol solvent. This mixture was stirred until the DEGBCF dissolved. A dropwise addition, via disposable pipette, of the DEGBCF solution to the cooled glycerol carbonate solution was undertaken over a 45 minute period of time. The formation of a precipitate (the hydrochloride salt of triethylamine) was observed after the addition of several mL of the DEGBCF solution had been added and continued to form throughout the duration of the addition. The precipitate became so thick in the beaker that stirring had to be continued with a large stir-rod for the last half of the DEGBCF addition. The mixture was allowed to set/stir, while covered, for about 2 days at room temperature. The product was isolated by filtration using a 600 mL course fritted Buchner type funnel equipped with 300 grams of silica gel and a 2 liter vacuum flask. Fresh THF was added to wet the silica, and the THF was gravity eluted through the silica filled Buchner funnel to the attached 2 liter vacuum flask. The final product mixture, including salts that were formed, was then poured into the fritted funnel containing the THF wetted silica with a slight vacuum being pulled. When the solvent was almost completely through the silica, the vacuum was removed and about 0.5 liter of fresh THF was added to the 1000 mL glass beaker, swirled and was slowly added to the fritted funnel and allowed to elute through. This wash process was repeated twice. The clear liquid that was collected in the 2 liter vacuum flask was subjected to rotary evaporation or some other evaporation technique to remove the solvent, resulting in a clear viscous product.

EXAMPLE 5

Cyclic Carbonate Monomer

A cyclic carbonate monomer having the structure of Formula (A12), wherein $R_5$ is $(CH_2)_6$, was prepared as follows. To a 1000 mL glass beaker was added a Teflon® coated large football-shaped stir magnet, 47.2 grams of glycerol carbonate, 41.0 grams of triethylamine, and 180 grams of tetrahydrofuran (THE) solvent. The beaker was covered with a watch glass and placed in 190×100 2.5 L Pyrex® crystallizing dish filled with ice-water and allowed to stir/cool for about 30 min. To an additional 250 mL beaker were added a Teflon® coated stir magnet, 47.2 grams of hexamethylene-dichloroformate (HMDCF), and 50 grams of THF solvent. This mixture was allowed to stir until the HMDCF dissolved. A dropwise addition, via disposable pipet, of the HMDCF solution to the cooled glycerol carbonate solution was undertaken over a 45 minute period of time. The formation of a precipitate (the hydrochloride salt of triethylamine) was observed after several mL of the HMDCF solution had been added. Precipitate continued to form throughout the duration of the addition. The mixture was allowed to set/stir, while covered, for about 2 days at room temperature. Workup entailed adding about 300 grams of silica gel to a 600 mL course fritted Buchner type funnel placed on a 2 liter vacuum flask. Fresh THF was added to wet the silica and gravity eluted through the silica filled Buchner funnel to an attached 2 liter vacuum flask. The final product mixture, including salts that were formed, was then poured into the fritted funnel containing the THF wetted silica with a slight vacuum being pulled. When the solvent was almost completely through the silica, the vacuum was removed and about 0.5 liter of fresh THF was added to the 1000 mL glass beaker, swirled and slowly added to the fritted funnel and allowed to elute through. This wash process was repeated twice. The clear liquid that was collected in the 2 liter vacuum flask was subjected to rotary evaporation or some other evaporation technique to remove the solvent and resulting in a clear viscous product.

EXAMPLE 6

Inks for 3D Printing

Inks according to some embodiments described herein were prepared as follows. Specifically, in the present Example, inks were prepared for use in a "one-component" ink printing process, such as in SLA, cSLA, or DLP 3D printing. In general, one or more photoinitiators described hereinabove were first dissolved in low viscosity UV-curable monomers described hereinabove (such IBOMA, SR272, and/or SR205) by stirring. In some cases, heating was also carried out while stirring. Next, urethane-acrylate oligomers described hereinabove (such as BR-371 or BR-571 MB) and cyclic carbonate monomers described hereinabove were added and mixed with a mixer (obtained from Thinky Corporation). Then one or more amine components described above were added and mixed with the mixer to obtain a "one-component" ink for casting or for 3D printing process such as SLA, cSLA, or DLP.

EXAMPLE 7

Inks for 3D Printing

Inks according to some embodiments described herein were prepared as follows. Specifically, in the present Example, a first ink and a second ink were prepared. The first ink and second ink could be used in a kit described herein. Alternatively, as described further below, the first ink and the second ink could be combined with one another to form a single ink which may be used in a 3D printing system or 3D printing method with or without the use of one or more other inks.

In general, the first ink (which may also be referred to as "Part A") included a cyclic carbonate monomer having a plurality of cyclic carbonate moieties, as described above in Section I. The first ink also included a second curable material consisting of additional (meth)acrylate monomers. Further, the first ink included a photoinitiator. The second ink (which may also be referred to as "Part B") included an amine monomer comprising a plurality of primary or secondary amine moieties. The specific components of the first and second ink are provided below.

The first ink ("Part A") included 7.24 g TMP tricarbonate (CAS No. 147876-32-2, from SPECIFIC POLYMERS) (cyclic carbonate monomer); 27.93 g triethylene glycol diacrylate (SR272, from SARTOMER) (additional curable material); and 0.84 g 2,4,6-trimethylbenzoyldiphenylphosphine oxide (Lucirin TPO) (photoinitiator).

The second ink ("Part B") included 7.14 g jeffamine T-403 (triamine, from HUNTSMAN CHEMICAL) (amine monomer).

To form each ink, the individual components of each ink are combined and mixed. The mixture was heated to a temperature of about 20-25° C. with stirring. The heating and stirring were continued until the mixture attained a substantially homogenized liquid state. The liquid mixture was then filtered.

For use in MJM 3D printing, Part A and Part B are fed into two separate channels/ink dispensers and then mixed by jetting the two inks onto adjacent or nearby locations on a substrate or into adjacent or nearby voxels. Such a method of mixing inks can be referred to as "digital mixing." The jetted materials are then exposed to UV radiation for UV curing. In particular, the UV curing step cures the (meth)acrylate monomers of Part A. During this step, some amount of reaction between the cyclic carbonate monomer of Part A and the amine monomer of Part B may also occur. However, the degree of reaction may be limited. The 3D article printed in this manner (without substantial reaction of the cyclic carbonate and amine monomers) can have sufficient green strength to permit handling of the article without damaging the article or loss of printing resolution of the article. To complete the reaction between the cyclic carbonate and amine monomers, the printed article can be placed in an oven to cure the cyclic carbonate and amine monomers. Moreover, if a support material (such as a wax support material) is used, this second (or "post") curing step can also melt the wax support material away from the printed article. Post-curing in the oven can occur at a temperature of 80-100° C. for a time period of 2-4 hours. In some cases, an article is first heated in an oven at 80° C. for 2 hours, followed by heating in the oven at 100° C. for an additional 2 hours.

For use in SLA, cSLA, or DLP 3D printing, Part A and Part B are mixed before use. The mixture is then fed into a vat, reservoir, or ink cartridge for 3D printing. The photo-curing that occurs during the SLA, cSLA, or DLP process can polymerize the (meth)acrylate monomers of Part A, again imparting sufficient green strength to the article to permit handling of the article following the printing process without damage or loss of printing resolution. The article can be removed from the vat or reservoir following printing, optionally cleaned, and then placed in an oven for completion of the reaction between the cyclic carbonate and amine monomers, as described above.

EXAMPLE 8

Inks for 3D Printing

Inks according to some embodiments described herein were prepared as follows. Specifically, in the present Example, a first ink and a second ink were prepared. The first ink and second ink could be used in a kit described herein. Alternatively, as described further below, the first ink and the second ink could be combined with one another to form a single ink which may be used in a 3D printing system or 3D printing method with or without the use of one or more other inks.

The first ink (which may also be referred to as "Part A") included a cyclic carbonate monomer having a cyclic carbonate moiety and a (meth)acrylate moiety. Specifically, the first curable material had the structure of Formula (A9) above, wherein $R_1$ is $CH_2CH_2$, $R_2$ is $CH_2$, and $R_5$ is $CH_3$. The first ink also included an additional curable material consisting of additional (meth)acrylate monomers. Further, the first ink included a photoinitiator. The second ink (which may also be referred to as "Part B") included amine monomer having a plurality of primary or secondary amine moieties. The specific components of the first and second ink are provided below.

The first ink ("Part A") included 20.5 g Formula (A9) (cyclic carbonate moiety); 31.2 g triethylene glycol dimethacrylate (SR205, from SARTOMER) (additional curable material); and 0.94 g 2,4,6-trimethylbenzoyldiphenylphosphine oxide (Lucirin TPO) (photoinitiator).

The second ink ("Part B") included 10.7 g Jeffamine XTJ 566 (triamine, from HUNTSMAN CHEMICAL) (amine monomer). The amounts of the monomers were selected based on a desired molar ratio of cyclic carbonate moiety (in Part A) to amine moiety (in Part B). In general, the ratio can be varied from 0.5:1 (cyclic carbonate:amine) to 2:1, or from 0.8:1 to 1.7:1. Additionally, the weight ratio of the sum of the carbonate and amine monomers relative to the total amount of additional (meth)acrylate diluents can range from 1:5 to 1:0 (carbonate and amine monomers:(meth)acrylate diluents).

To form each ink, the individual components of each ink are combined and mixed. The mixture was heated to a temperature of about 20-25° C. with stirring. The heating and stirring were continued until the mixture attained a substantially homogenized liquid state. The liquid mixture was then filtered.

For use in MJM 3D printing, Part A and Part B are fed into two separate channels/ink dispensers and then mixed by jetting the two inks onto adjacent or nearby locations on a substrate or into adjacent or nearby voxels (digital mixing). The jetted materials are then exposed to UV radiation for UV curing. In particular, the UV curing step cures the (meth)acrylate monomers and the (meth)acrylate moiety of the cyclic carbonate monomer of Part A. During this step, some amount of reaction between the cyclic carbonate moieties of the cyclic carbonate monomer of Part A and the amine moieties of the amine monomer of Part B may also occur. However, the degree of reaction may be limited. The 3D article printed in this manner (without substantial reaction of the cyclic carbonate and amine moieties) can have sufficient green strength to permit handling of the article without damaging the article or loss of printing resolution of the article. To complete the reaction between the cyclic carbonate and amine monomers, the printed article can be placed in an oven to cure the cyclic carbonate and amine monomers. Moreover, if a support material (such as a wax support material) is used, this second (or "post") curing step can also melt the wax support material away from the printed article. Post-curing in the oven can occur at a temperature of 80-100° C. for a time period of 2-4 hours. In some cases, an article is first heated in an oven at 80° C. for 2 hours, followed by heating in the oven at 100° C. for an additional 2 hours.

For use in SLA, cSLA, or DLP 3D printing, Part A and Part B are mixed before use. The mixture is then fed into a vat, reservoir, or ink cartridge for 3D printing. The photocuring that occurs during the SLA, cSLA, or DLP process can polymerize the (meth)acrylate monomers and (meth)acrylate moiety of Formula (A9) of Part A, again imparting sufficient green strength to the article to permit handling of the article following the printing process without damage or loss of printing resolution. The article can be removed from the vat or reservoir following printing, optionally cleaned, and then placed in an oven for completion of the reaction between the cyclic carbonate and amine monomers, as described above.

EXAMPLE 9

Inks for 3D Printing

Inks according to some embodiments described herein were prepared as follows. Specifically, in the present Example, a first ink and a second ink were prepared. The first ink and second ink could be used in a kit described herein. Alternatively, as described further below, the first ink and the second ink could be combined with one another to form a single ink which may be used in a 3D printing system or 3D printing method with or without the use of one or more other inks.

The first ink (which may also be referred to as "Part A") included a cyclic carbonate monomer having a cyclic carbonate moiety and a (meth)acrylate moiety. The first ink also included an additional curable material consisting of additional (meth)acrylate monomers. Further, the first ink included a photoinitiator. The second ink (which may also be referred to as "Part B") included an amine monomer comprising a plurality of primary or secondary amine moieties. The specific components of the first and second ink are provided below.

The first ink ("Part A") included 20 g glycerol carbonate methacrylate (cyclic carbonate monomer); 35 g triethylene glycol dimethacrylate (SR205, from SARTOMER) (additional curable material); and 1.0 g 2,4,6-trimethylbenzoyl-diphenylphosphine oxide (Lucirin TPO) (photoinitiator).

The second ink ("Part B") included 15 g Jeffamine XTJ 566 (triamine, from HUNTSMAN CHEMICAL) (amine monomer). The amounts of the various monomers and curable materials were selected based on a desired molar ratio of cyclic carbonate moiety (in Part A) to amine moiety (in Part B). In general, the ratio can be varied from 0.5:1 (cyclic carbonate:amine) to 2:1, or from 0.8:1 to 1.7:1. Additionally, the weight ratio of the sum of the carbonate and amine monomers relative to the total amount of additional (meth)acrylate diluents can range from 1:5 to 1:0 (carbonate and amine monomers:(meth)acrylate diluents).

To form each ink, the individual components of each ink are combined and mixed. The mixture was heated to a temperature of about 75-85° C. with stirring. The heating and stirring were continued until the mixture attained a substantially homogenized molten state. The molten mixture was then filtered.

For use in MN 3D printing, Part A and Part B are fed into two separate channels/ink dispensers and then mixed by jetting the two inks onto adjacent or nearby locations on a substrate or into adjacent or nearby voxels (digital mixing). The jetted materials are then exposed to UV radiation for UV curing. In particular, the UV curing step cures the (meth)acrylate monomers and the (meth)acrylate moiety of the cyclic carbonate monomer of Part A. During this step, some amount of reaction between the cyclic carbonate moieties of the cyclic carbonate monomer of Part A and the amine moieties of the amine monomer of Part B may also occur. However, the degree of reaction may be limited. The 3D article printed in this manner (without substantial reaction of the cyclic carbonate and amine moieties) can have sufficient green strength to permit handling of the article without damaging the article or loss of printing resolution of the article. To complete the reaction between the cyclic carbonate and amine moieties, the printed article can be placed in an oven to cure the cyclic carbonate and amine monomers. Moreover, if a support material (such as a wax support material) is used, this second (or "post") curing step can also melt the wax support material away from the printed article. Post-curing in the oven can occur at a temperature of 80-100° C. for a time period of 2-4 hours. In some cases, an article is first heated in an oven at 80° C. for 2 hours, followed by heating in the oven at 100° C. for an additional 2 hours.

For use in SLA, cSLA, or DLP 3D printing, Part A and Part B are mixed before use. The mixture is then fed into a vat, reservoir, or ink cartridge for 3D printing. The photocuring that occurs during the SLA, cSLA, or DLP process can polymerize the (meth)acrylate monomers (the additional curable material) and the (meth)acrylate moiety of the cyclic carbonate monomer of Part A, again imparting sufficient green strength to the article to permit handling of the article following the printing process without damage or loss of printing resolution. The article can be removed from the vat or reservoir following printing, optionally cleaned, and then placed in an oven for completion of the reaction between the cyclic carbonate and amine monomers, as described above.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. An ink for use in a three-dimensional printing system comprising:
   a cyclic carbonate monomer; and
   an amine monomer.

2. The ink of claim 1, wherein the cyclic carbonate monomer comprises two cyclic carbonate moieties.

3. The ink of claim 1, wherein the cyclic carbonate monomer has the structure of Formula (A1), Formula (A2), Formula (A3), or Formula (A4):

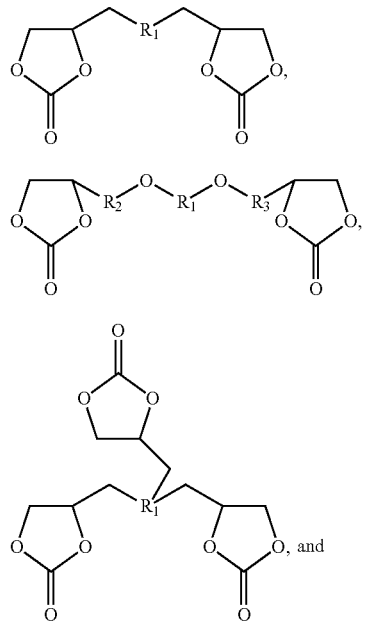

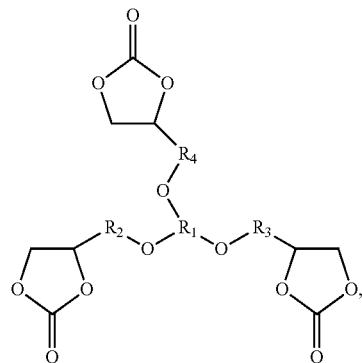

wherein $R_1$, $R_2$, $R_3$, and $R_4$ are each independently a linear or branched C1-C36 alkyl or alkylene, alkenyl or alkenylene, aryl or arylene, or heteroaryl or heteroarylene moiety.

4. The ink of claim 3, wherein the cyclic carbonate monomer has the structure of Formula (A6):

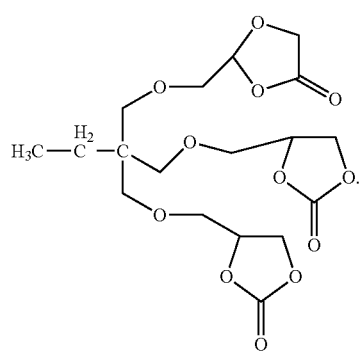

5. The ink of claim 1, wherein the cyclic carbonate monomer has the structure of Formula (A9):

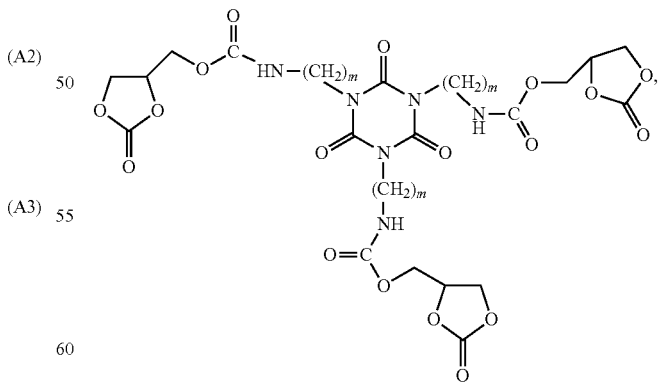

wherein m is an integer from 1 to 36.

6. The ink of claim 1, wherein the cyclic carbonate monomer has the structure of Formula (A10), Formula (A11), Formula (A12), or Formula (A13):

(A10)
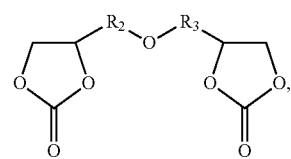

(A11)
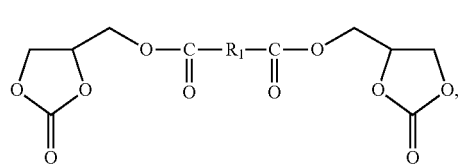

(A12)
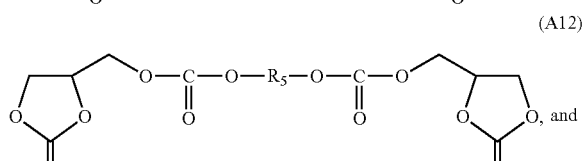

(A13)
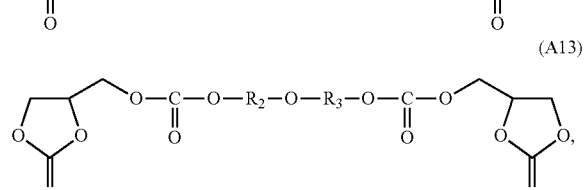

wherein R₁, R₂, and R₃ are each independently a linear or branched C1-C36 alkyl or alkylene, alkenyl or alkenylene, aryl or arylene, or heteroaryl or heteroarylene moiety, and R₅ is a linear or branched C2-C36 alkyl or alkylene, alkenyl or alkenylene, aryl or arylene, or heteroaryl or heteroarylene moiety.

7. The ink of claim 1, wherein the cyclic carbonate monomer comprises one or more (meth)acrylate moieties.

8. The ink of claim 1, wherein the cyclic carbonate monomer has the structure of Formula (A14) or Formula (A15):

(A14)
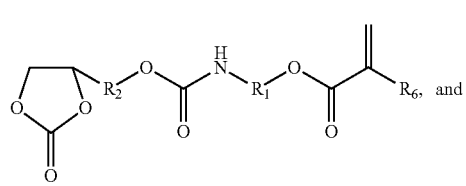

(A15)
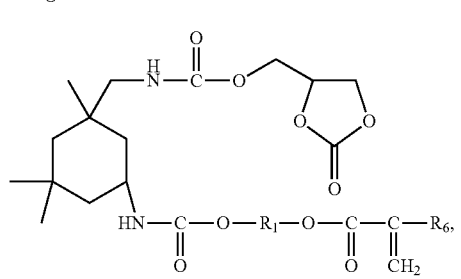

wherein $R_1$ and $R_2$ are each independently a linear or branched C1-C36 alkyl or alkylene, alkenyl or alkenylene, aryl or arylene, or heteroaryl or heteroarylene moiety; and $R_6$ is H or $CH_3$.

9. The ink of claim 1, wherein the cyclic carbonate monomer has the structure of Formula (A17) or Formula (A18):

(A17)
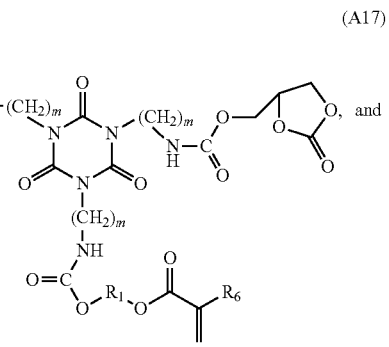

(A18)
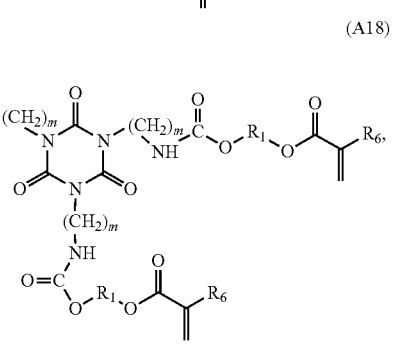

wherein m is an integer from 1 to 36;

$R_1$ is a linear or branched C1-C36 alkyl or alkylene, alkenyl or alkenylene, aryl or arylene, or heteroaryl or heteroarylene moiety; and $R_6$ is H or $CH_3$.

10. The ink of claim 1, wherein the cyclic carbonate monomer has the structure of Formula (A20):

(A20)
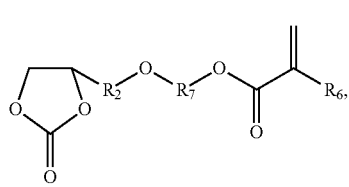

wherein $R_2$ is a linear or branched C1-C20 alkyl or alkylene, alkenyl or alkenylene, aryl or arylene, or heteroaryl or heteroarylene moiety;

$R_6$ is H or $CH_3$;

$R_7$ is a linear or branched C1-C36 alkyl or alkylene, alkenyl or alkenylene, aryl or arylene, or heteroaryl or heteroarylene moiety, or $(CH_2CH(R_8)O)_n$;

$R_8$ is H or $CH_3$; and n is an integer from 1 to 100.

11. The ink of claim 1, wherein the cyclic carbonate monomer has the structure of Formula (A21):

(A21)

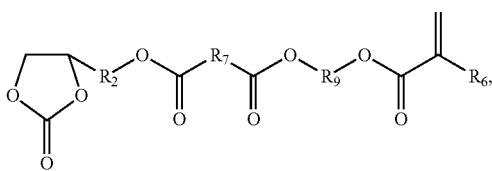

wherein $R_2$ and $R_9$ are each independently a linear or branched C1-C36 alkyl or alkylene, alkenyl or alkenylene, aryl or arylene, or heteroaryl or heteroarylene moiety; and $R_6$ is H or $CH_3$;

$R_7$ is a linear or branched C1-C36 alkyl or alkylene, alkenyl or alkenylene, aryl or arylene, or heteroaryl or heteroarylene moiety, or $(CH_2CH(R_8)O)_n$;

$R_8$ is H or $CH_3$; and n is an integer from 1 to 100.

12. The ink of claim 1, wherein the amine monomer comprises two amine moieties.

13. The ink of claim 1, wherein the amine monomer has the structure of Formula (B1):

$$H_2N-R_{10}-NH_2 \quad (B1),$$

wherein $R_{10}$ is a linear or branched C1-C36 alkyl or alkylene, alkenyl or alkenylene, aryl or arylene, or heteroaryl or heteroarylene moiety.

14. The ink of claim 1, wherein the amine monomer comprises at least one secondary or tertiary amine moiety.

15. The ink of claim 1, wherein the ink comprises 10-70 wt. % amine monomer, based on a total weight of the ink.

16. The ink of claim 1, wherein the cyclic carbonate monomer comprises one or more ethylenically unsaturated moieties.

17. The ink of claim 1, wherein the ink comprises 10-70 wt. % of cyclic carbonate monomer, based on a total weight of the ink.

18. The ink of claim 1, wherein the ink has a non-cured dynamic viscosity of about 200 to 2000 cP at 30° C.

* * * * *